United States Patent

Manabe

[11] Patent Number: 5,431,438
[45] Date of Patent: Jul. 11, 1995

[54] AIR BAG SYSTEM FOR AUTOMOTIVE VEHICLE

[75] Inventor: Toshiyuki Manabe, Hiroshima, Japan

[73] Assignee: Mazda Motor Corporation, Hiroshima, Japan

[21] Appl. No.: 208,504

[22] Filed: Mar. 9, 1994

Related U.S. Application Data

[63] Continuation of Ser. No. 962,085, Oct. 16, 1992, abandoned, which is a continuation of Ser. No. 676,985, Mar. 29, 1991, abandoned.

[30] Foreign Application Priority Data

Mar. 29, 1990 [JP] Japan .............. 2-033988 U

[51] Int. Cl.6 .......................................... B60R 21/16
[52] U.S. Cl. .................................................. 280/731
[58] Field of Search ................ 280/731, 736, 743 R; 74/558, 552

[56] References Cited

U.S. PATENT DOCUMENTS

| | | | |
|---|---|---|---|
| 3,787,074 | 1/1974 | Lewis et al. | 280/731 |
| 3,819,205 | 6/1974 | Dunford et al. | 280/731 |
| 3,895,823 | 7/1975 | Stephenson | 280/731 |
| 4,325,568 | 4/1982 | Clark et al. | 280/731 |
| 4,785,144 | 11/1988 | Fosnaugh et al. | 280/731 |
| 4,830,401 | 5/1989 | Honda | 280/736 |
| 4,962,947 | 10/1990 | Nagata et al. | 74/552 |
| 5,002,306 | 3/1991 | Hiramitsu et al. | 280/731 |
| 5,062,661 | 11/1991 | Winget | 280/731 |

FOREIGN PATENT DOCUMENTS

| | | | |
|---|---|---|---|
| 52-5128 | 2/1977 | Japan . | |
| 0066043 | 4/1982 | Japan | 280/731 |

Primary Examiner—Eric D. Culbreth
Attorney, Agent, or Firm—Keck, Mahin & Cate

[57] ABSTRACT

A modular occupant restraint system for protecting a driver in an automobile during a collision of the automobile has an air bag module, installed in a steering wheel, including an air bag which is inflatable and unfoldable by gas during a collision of the automobile. A baseplate, for installing the air bag module in the steering wheel, is detachably mounted on the steering wheel, and is provided with a mounting bracket through which a horn switch is mounted on the baseplate on one side of the air bag module.

11 Claims, 11 Drawing Sheets

AIR BAG SYSTEM FOR AUTOMOTIVE VEHICLE

This is a continuation of application Ser. No. 07/962,085, filed Oct. 16, 1992, abandoned, which is a continuation of application Ser. No. 07/676,985, filed Mar. 29, 1991, abandoned.

The present invention relates to an air bag device for an automobile and, more particularly, to a modular horn switch in an air bag module attached to a steering wheel.

BACKGROUND OF THE INVENTION

1. Field of the Invention

In the prior art, an air bag device, including an air bag module disposed on the steering wheel, has been used in practice. Such an air bag module is typically assembled in the steering wheel after the steering wheel is fitted to the top end of the steering column.

If a parting line, which outlines the external form of the air bag module, appears in an upper surface of the steering wheel, midway of the spoked portion of the steering wheel, the external appearance of the steering wheel is impaired. It is, therefore, known to extend the air bag module in a direction of the spoked portion, locating the parting line in the neighborhood of the outer end of the spoked portion. However, when the air bag module extends up to the neighborhood of the outer end of the spoked portion, the assembly structure required to assemble the horn switch in the steering wheel is made more complicated.

2. Description of Related Art

Accordingly, in Japanese Patent Publication No. 52-5128, a modular occupant restraint device is disclosed, which includes an air bag module and a horn switch. The air bag module is disposed on the steering wheel, and the horn switch is arranged laterally of the air bag module, between a cover member for the upper part of the air bag module and a baseplate of the air bag module. This makes it possible to operate the horn switch by compressing the cover member.

In this occupant restraint device, a baseplate extension is provided in the baseplate of the air bag module, and extends towards the spoked portion of the steering wheel. In a plastic case which receives therein the air bag module, a case extension is formed, extending up to the upper side of the baseplate extension. A V-shaped rib is formed at the bottom surface of the case extension close to the baseplate extension. A body portion of a ground connection clip of the horn switch, i.e., an electrode member, is disposed on the case extension, and a curved portion of the ground connection clip is disposed so as to contact the baseplate extension portion. The air bag is received in a space in the plastic case, and the case extension borders on the space in the plastic case.

In the modular occupant restraint device described in this publication, however, there are several problems. When the horn switch is pressed for operation, because there is insufficiently rigid support for the ground connection clip, the case extension portion will possibly be deformed downward. This results in the feeling of operating the horn switch being diminished, since a curved portion of the ground connection clip of the horn switch comes into contact with the baseplate extension. Also, because this contact constitutes a part of a grounding circuit of the horn switch, the operation of the horn switch becomes inferior, due to poor contact made by this contact portion.

SUMMARY OF THE INVENTION

A primary object of the present invention is to provide an improved modular air bag system with a horn switch.

Another object of the present invention is to provide an automobile air bag device in which the feeling of operating a horn switch and the reliability of operation of the horn switch are improved.

These objects are achieved by providing a particularly constructed modular occupant restraint device, such as an automobile air bag system, for protecting a driver in an automobile vehicle during a collision of the automobile. According to the present invention, the air bag system comprises an air bag module including an air bag which is inflated and unfolded by gas during a collision of the automobile vehicle, and a baseplate detachably mounted on the steering wheel for installing the air bag module in the steering wheel and provided with a mounting bracket through which a horn switch is mounted on the baseplate on one side of the air bag module.

In the automobile air bag system according to the present invention, the air bag module is detachably mounted on the steering wheel through the baseplate. An extension is formed integrally with the baseplate and extends to the horn switch. A horn switch mounting plate is affixed to, and reliably supported by, the extension, so that when the horn switch is pressed for operation, the mounting plate is not unstable. Accordingly, the feeling of operation of the horn switch improves.

Neither the mounting plate nor the extension of the baseplate constitutes part of a horn switch grounding circuit. However, because an inferior connection between the mounting plate and the extension of the baseplate is eliminated, operational reliability of the horn switch can be maintained.

Furthermore, because the horn switch is made as a subassembly, installing the horn switch into the air bag system is easy.

According to the air bag system of the present invention, since the mounting plate of the horn switch is affixed to an extension of the baseplate, the feeling of operation of the horn switch is improved, and the operating reliability of the horn switch is maintained. Additionally, because the horn switch is made as a subassembly in the air bag module, the ease of assembly of the horn switch is improved.

BRIEF DESCRIPTION OF THE DRAWINGS

The above and other objects and features of the present invention will be apparent from the following description of preferred embodiments thereof when considered together with the accompanying drawings, wherein similar reference numbers have been used to denote the same or similar elements throughout the drawings, and in which.

DESCRIPTION OF THE PREFERRED EMBODIMENTS

Figure 1:
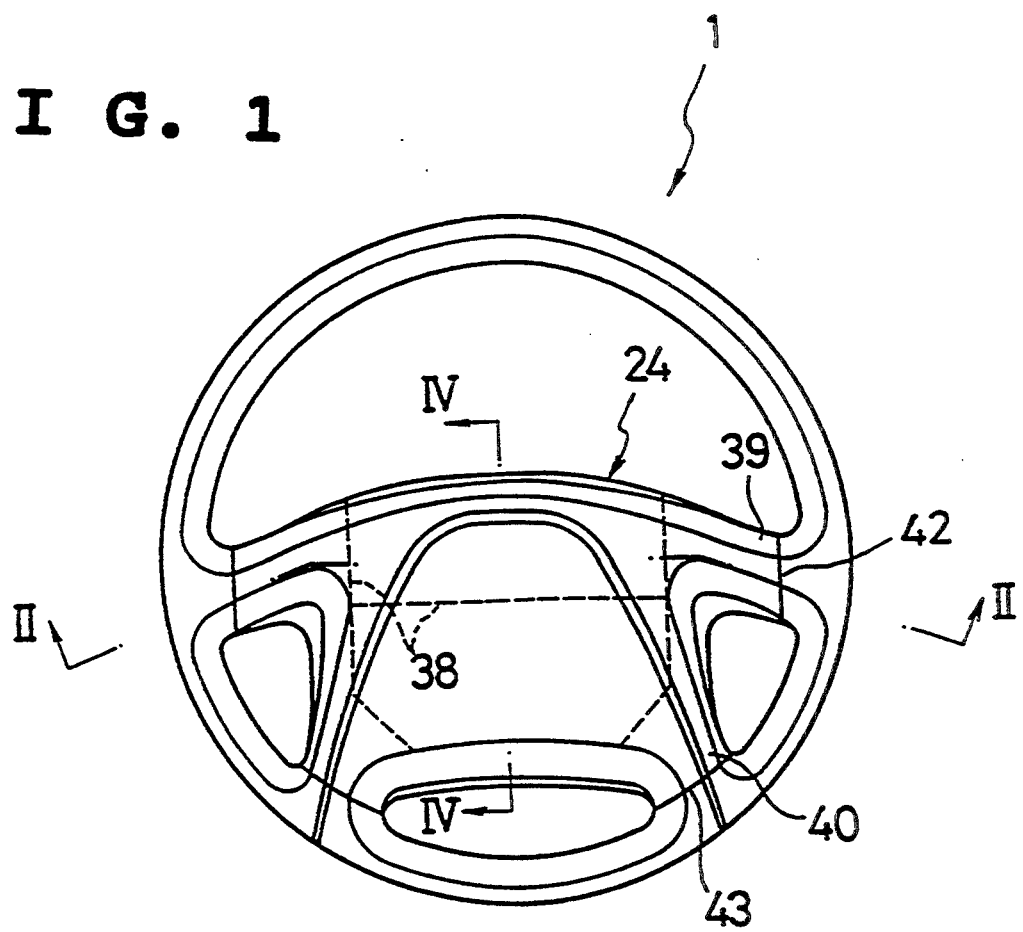
FIG. 1 is a plan view, showing a steering wheel in which an air bag module in accordance with a preferred embodiment of the present invention is installed.

Referring to the drawings in detail, and particularly to FIGS. 1 to 4, a steering wheel of an automobile having an air bag device in accordance with a preferred embodiment of the present invention is shown. The steering wheel 1 is equipped with a baseplate 2, which has a generally rectangular flange portion 2a. A spoke member 3 extends transversely left and right and is secured to the upper end portions of the base plate 2. A pair of spoke members 4 respectively extend obliquely and downward from right and left end portions of the baseplate 2 and are secured to the baseplate 2 and the transverse spoke member 3. An annular wheel body 5 is secured to the transverse spoke member 3 and the outer end portions of the downwardly extending spoke members 4. The spoke members 3 and 4 are formed with U-shaped cross sections opening downwardly.

The steering shaft 7 is fitted, at a spline shaft portion 7a thereof, into a boss member 6 secured to the baseplate 2, and the steering wheel 1 is secured to the upper end portion of the steering shaft 7 by means of tightening a nut 8, which is threaded onto the upper end portion of the steering shaft 7.

The baseplate 2 is disposed at a height smaller than that of the wheel body 5 by a predetermined amount. The left and right spoke portions 10 of the transverse spoke member 3 are formed with an outwardly rising inclination, and each of the spoke portions 11 of the spoke members 4 is disposed in an outwardly and upwardly inclined direction. An air bag module 20 is inserted above the baseplate 2. The wheel body 5 and the spoke portions 10 and 11 are covered with synthetic resin material, and the lower surface sides of the internal portions of the spoke portions 10 and 11 of the steering wheel 1 are covered by a lower cover 9 made of metal or synthetic resin.

A mounting seat 12 is disposed so as to mount the air bag module on four of the spoke portions 10, 11. Recesses 13, generally concave relative to the lower cover 9, are disposed in the outer side of the mounting seat 12. Bolt holes are formed in the inner walls of the recesses 13 and mounting seat 12.

The air bag module 20 is equipped with a baseplate 21, an inflator unit 22 containing an inflator, such as a gas generator and an igniter or a firing device, a folded-up air bag 23, and a synthetic resin cover member 24.

The inflator unit 22 and air bag 23 and cover member 24 are made as a module unit to form an air bag subassembly. This air bag module 20 is assembled by bolts 25 to the four spoke portions 10, 11 of the steering wheel 1.

Four extensions 26, 29, which are formed of steel sheet and are generally rectangular in form, extend from the four corners of the above-mentioned baseplate 21. Upper left and right pairs of extensions 26 extend part way along the upper surfaces of the respective upper left and right spoke portions 10. Each extension 26 is formed with a mounting portion 27, abutting against the mounting seat 12 of the spoke portion 10, and is further provided with a nut 28 secured thereto and a bolt hole 27a formed so as to correspond to the nut 28. The lower left and right pair of the extensions 29 extend part way along the upper surfaces of the lower left and right spoke portions 11. Each extension 29 is formed with a mounting portion which abuts against the mounting seat 12 of the spoke portion 11 and is attached with a nut. The extension is further formed with a bolt hole 30a corresponding with the nut. A downward reinforcing flange portion 31 is formed along the outer rim of the baseplate 21, and the air bag module 20 is assembled to the steering wheel 1 by being secured by bolts 25 and nuts 28 to the mounting seats 12 corresponding to the four mounting portions 27, 30.

The inflation unit 22 is inserted in and secured to the circular open aperture of the central portion of the baseplate 21. A number of holes 32 are formed in the lower end portion of an external case 22a of the inflation unit 22, and a number of holes (not shown) are also formed in the upper end portion of the case 22a. The inflation unit 22 is well known per se, and is formed such that its igniter is electrically connected to an external electrical source and to a plurality of collision sensors. When the automobile collides with an object, the collision sensors are activated, or turned ON, so as to form an electric circuit with the heater of the igniter, thereby activating the inflator to instantaneously generate a large quantity of gas and inflate and unfold the air bag.

Open ended rim portion 33 of the air bag 23 is secured to the baseplate 21 in the vicinity of the external circumference of the inflation unit 22 so as to receive the gas generated by the inflation unit 22 into the air bag 23 therethrough.

The cover 24, made of synthetic resin with embedded fiber netting 34, is equipped with an upper wall 35 covering the upper surface of the external portion of the wheel body 5 of the steering wheel 1. A circumferential wall 36 is integrally formed on the lower surface of the upper surface wall 35 and covers the external peripheral side of the air bag 23, and a flange 37 is formed integrally with the circumferential wall 36 and secures the cover 24 in the baseplate 21.

Figure 2:
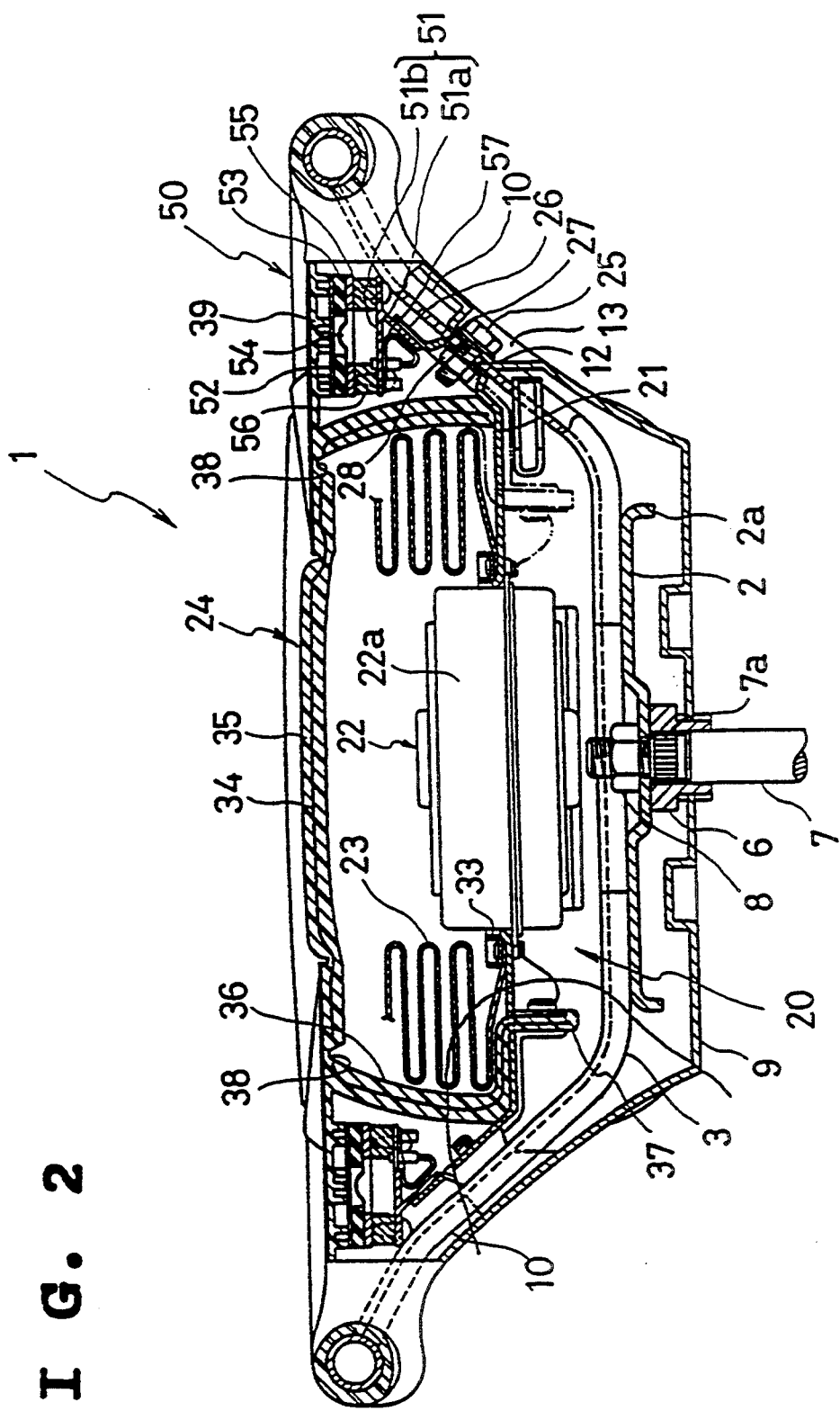
FIG. 2 is a cross-sectional view of FIG. 1 as seen along line II—II.
Figure 3:
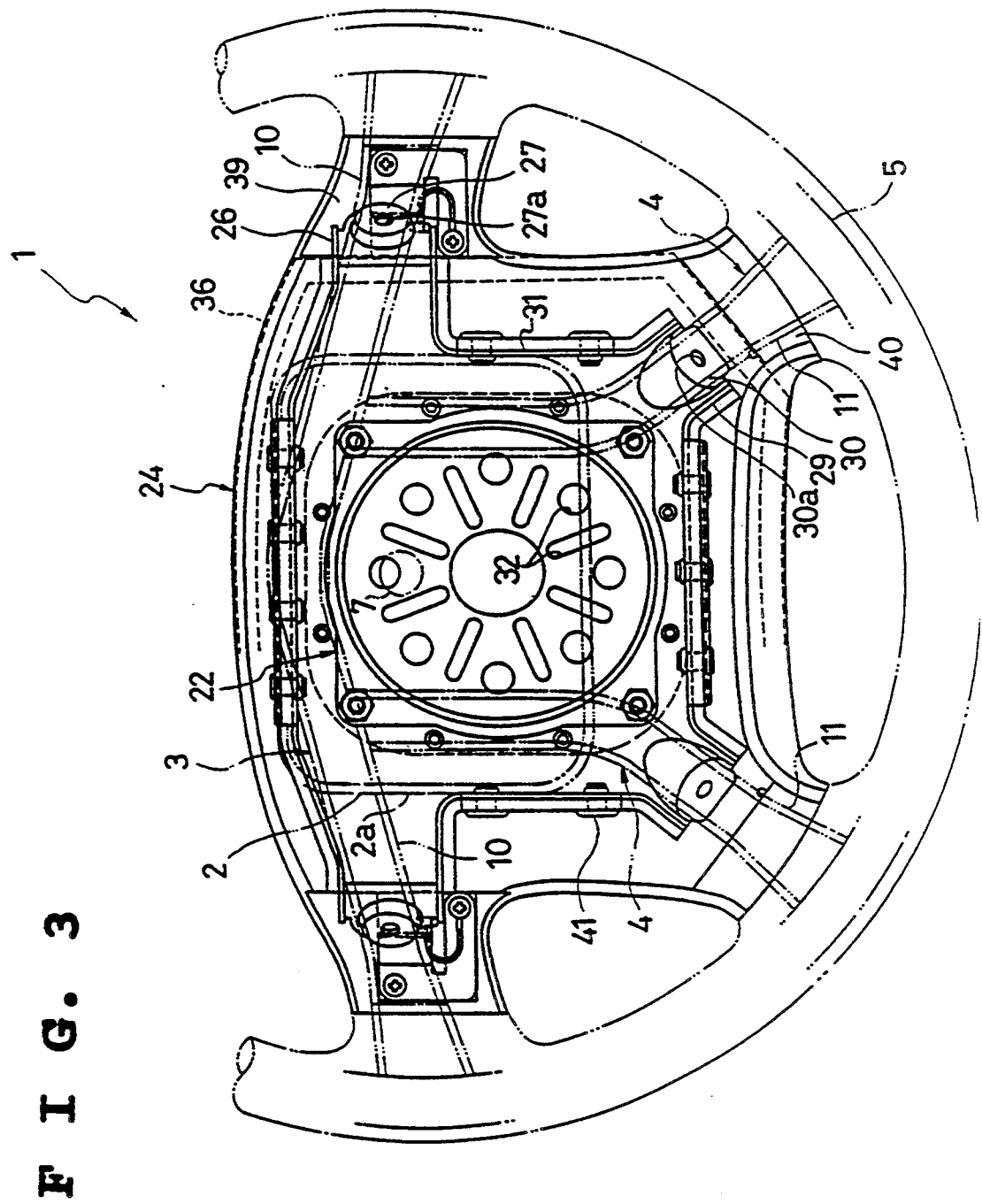
FIG. 3 is a bottom view showing the air bag module of FIG. 1.
Figure 4:
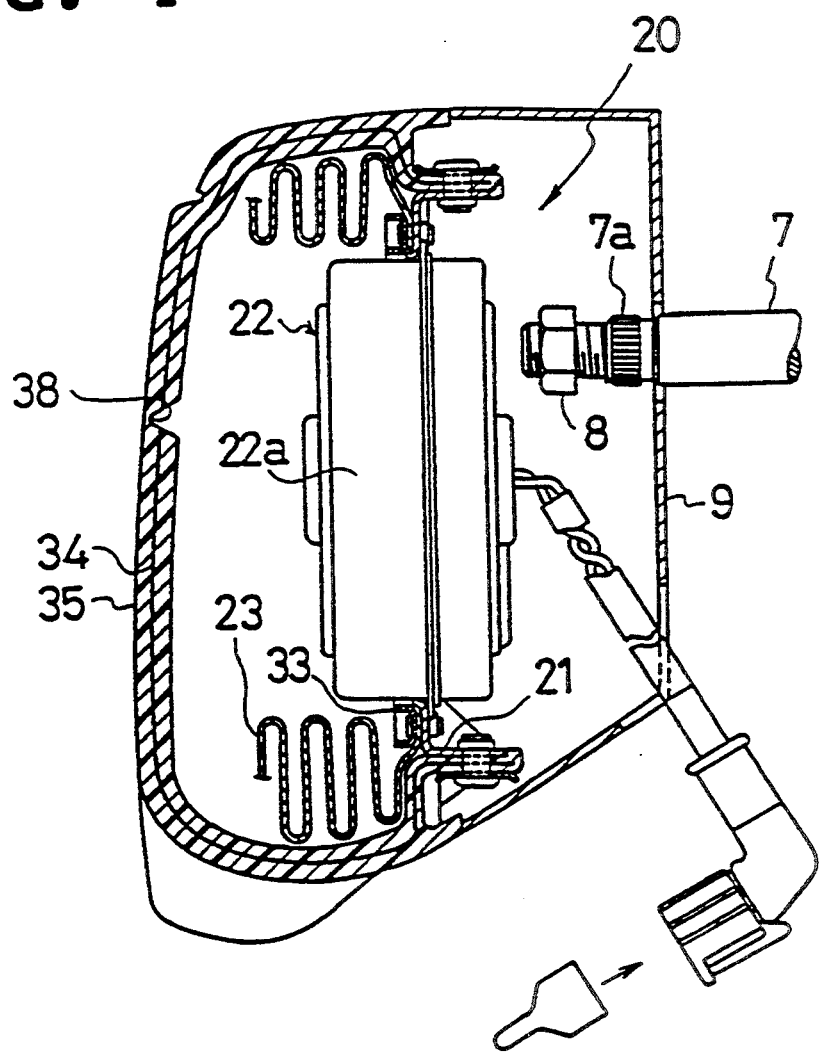
FIG. 4 is a cross-sectional view of FIG. 1 as seen along line IV—IV.
Figure 5:
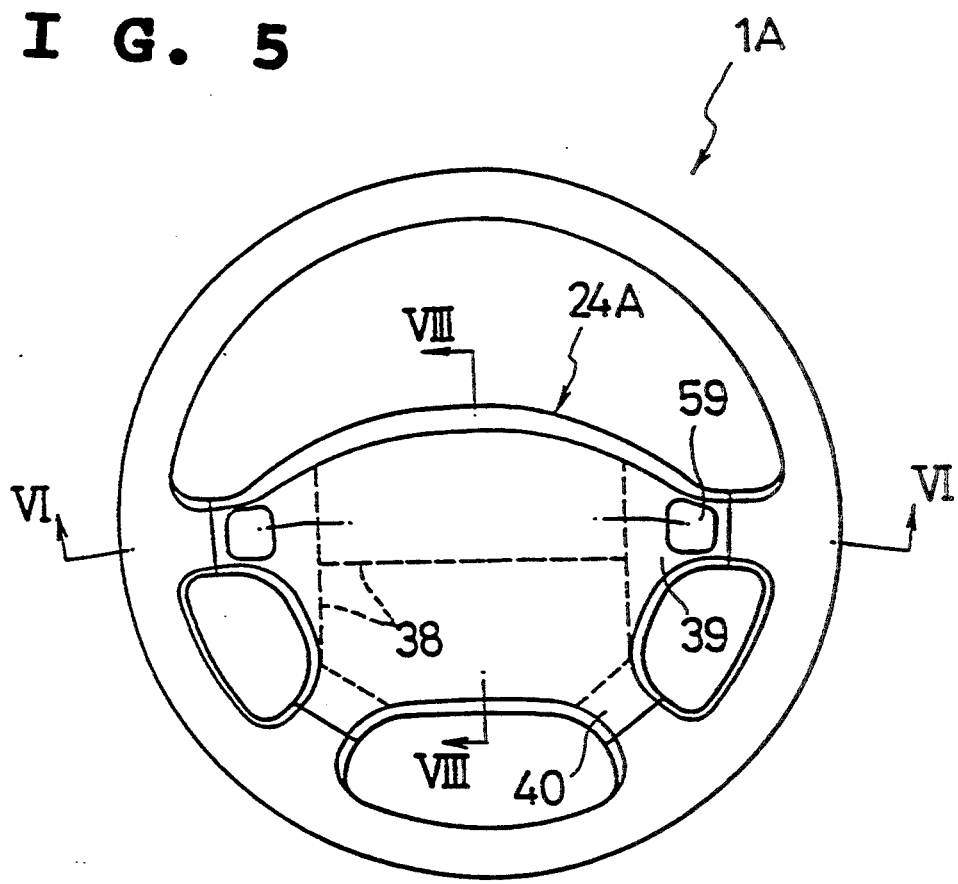
FIG. 5 is a plan view, similar to FIG. 1, showing a steering wheel in which an air bag module in accordance with another preferred embodiment of the present invention is installed.
Figure 6:
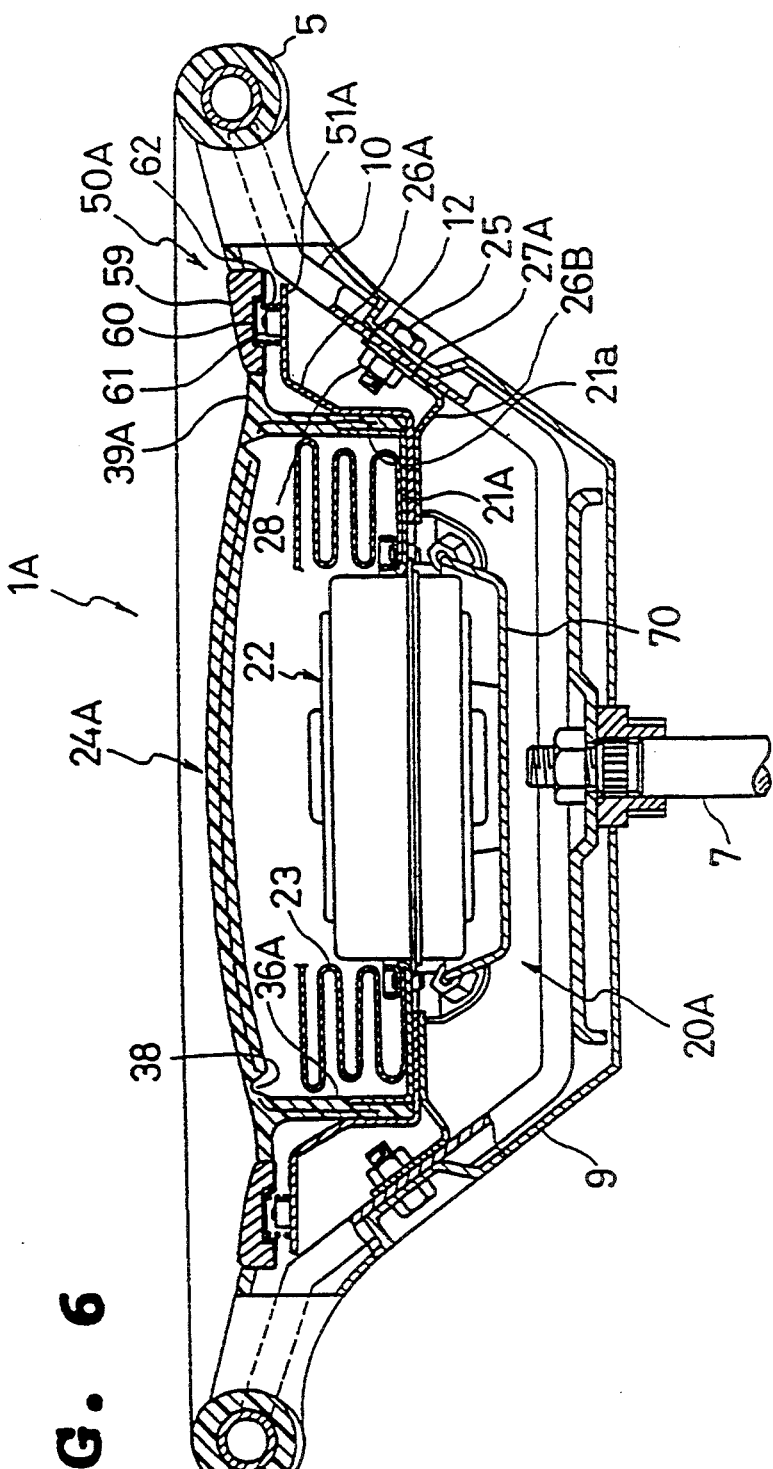
FIG. 6 is a cross-sectional view of FIG. 5 as seen along line VI—VI.
Figure 7:
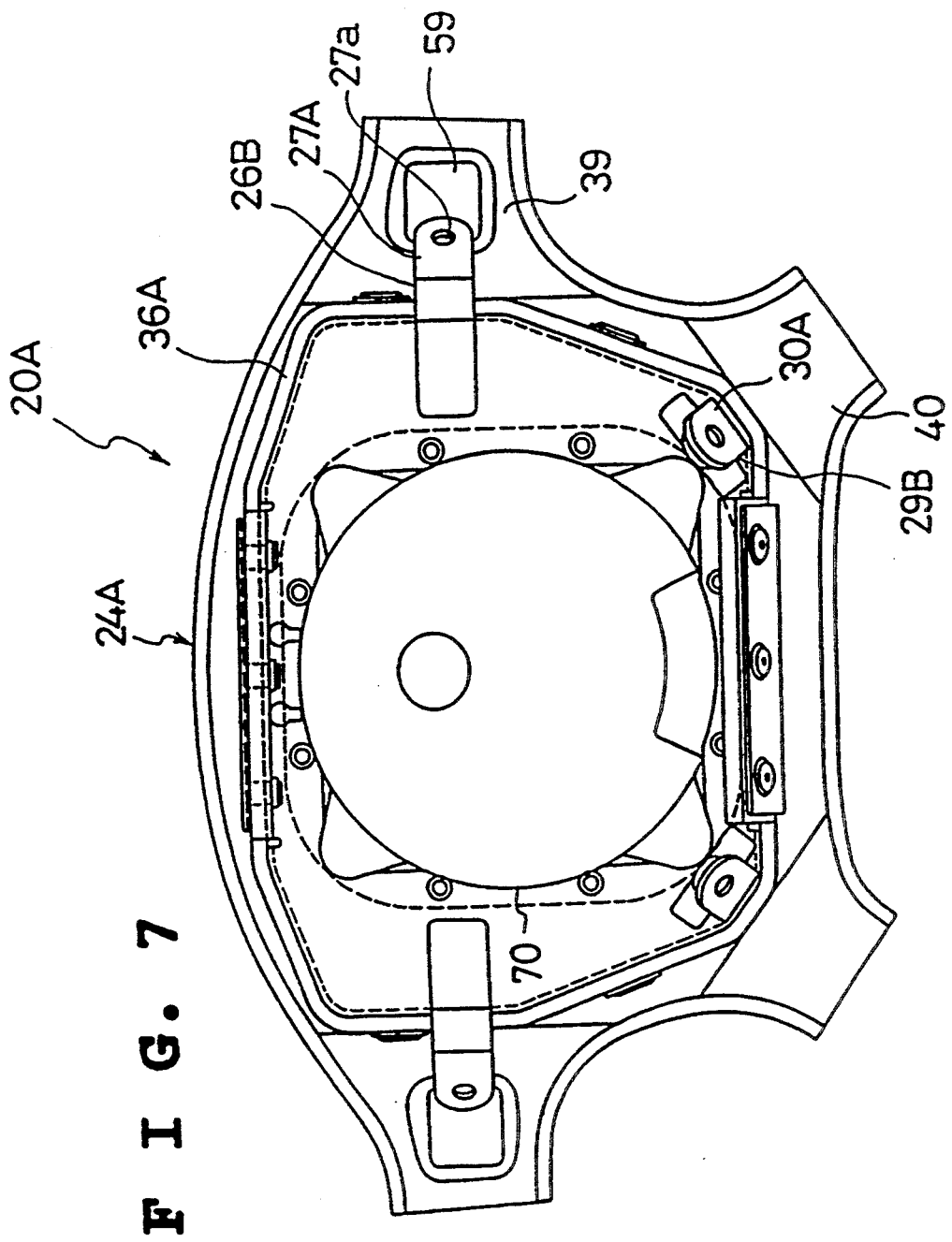
FIG. 7 is a bottom view showing the air bag module of FIG. 5.
Figure 8:
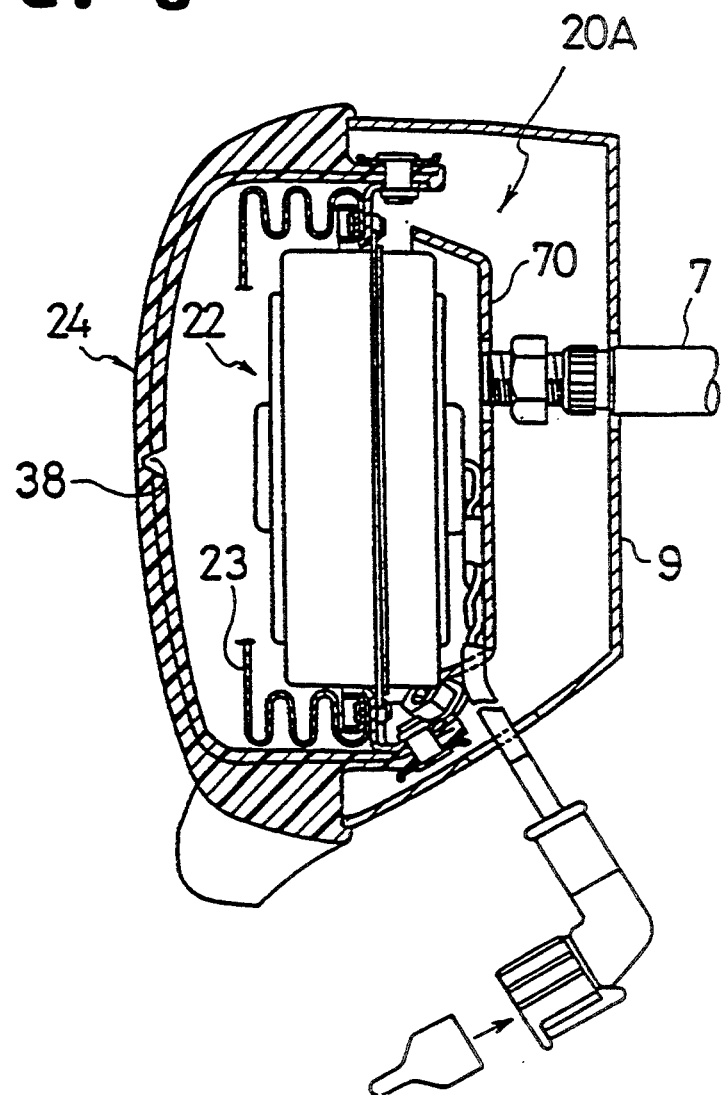
FIG. 8 is a cross-sectional view of FIG. 5 as seen along line VIII—VIII.
Figure 9:
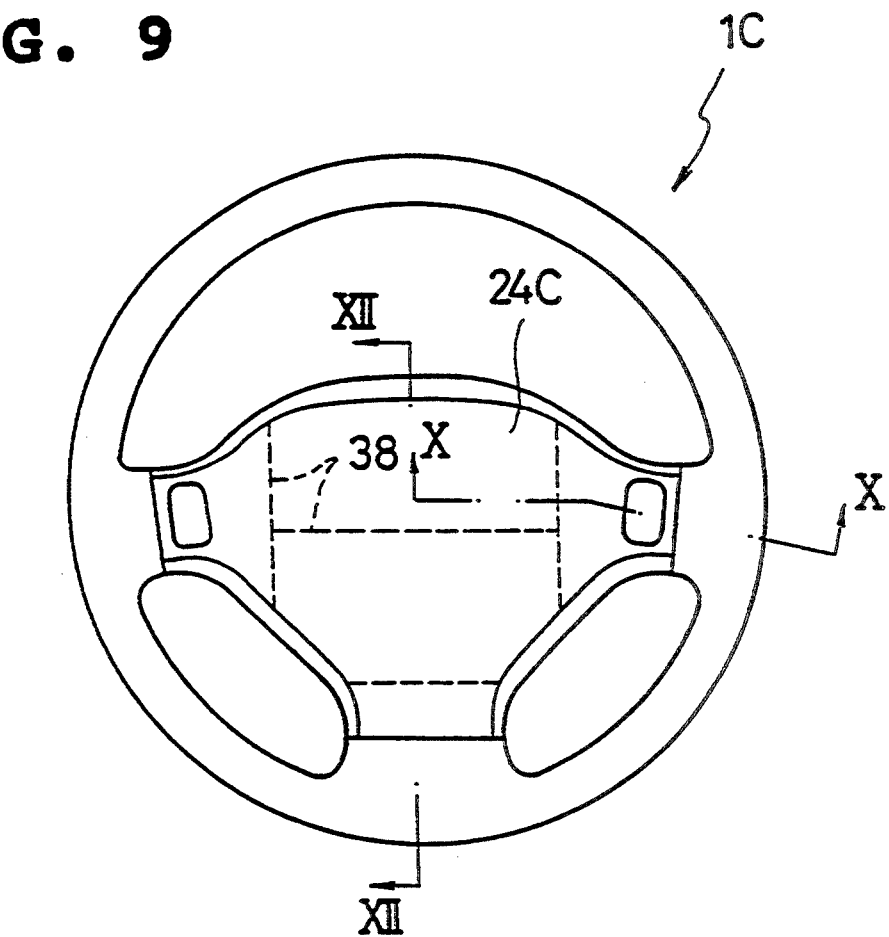
FIG. 9 is a plan view, similar to FIG. 1, showing a steering wheel in which an air bag module in accordance with still another preferred embodiment of the present invention is installed.
Figure 10:
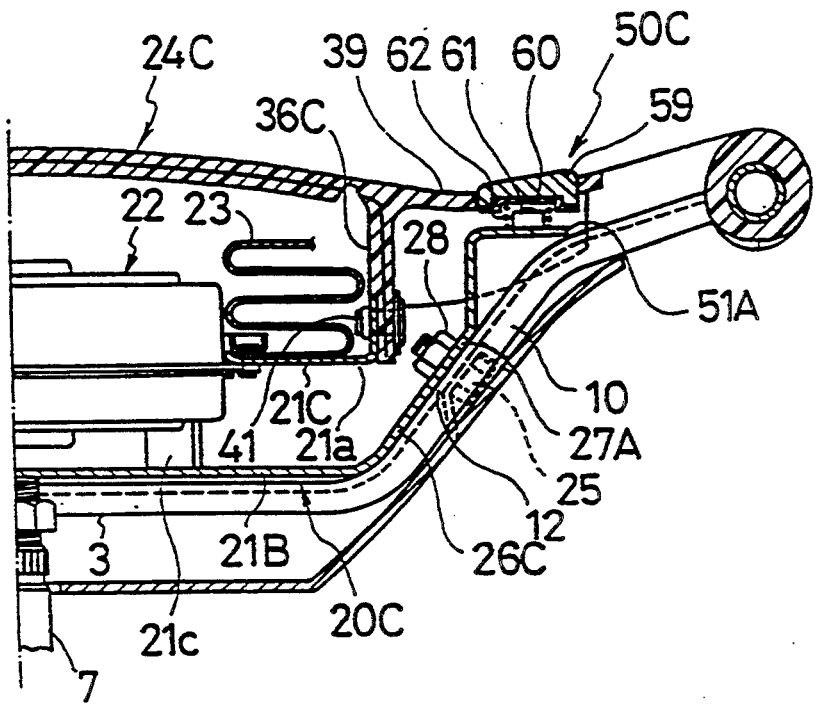
FIG. 10 is a cross-sectional view of FIG. 9 as seen along line X—X.
Figure 11:
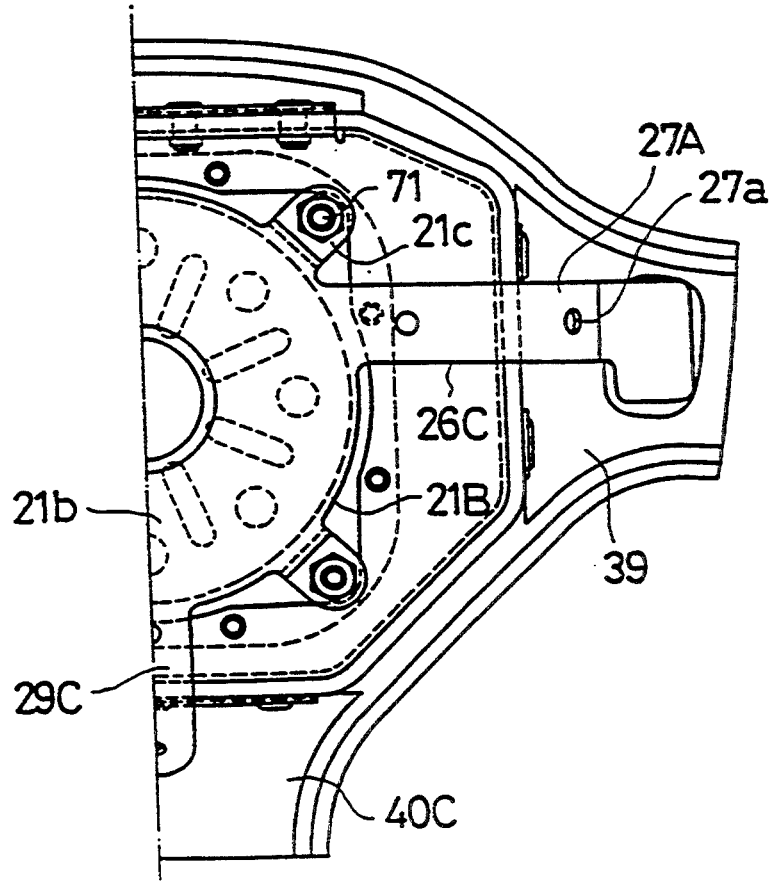
FIG. 11 is a bottom view, showing half of the air bag module of FIG. 9.
Figure 12:
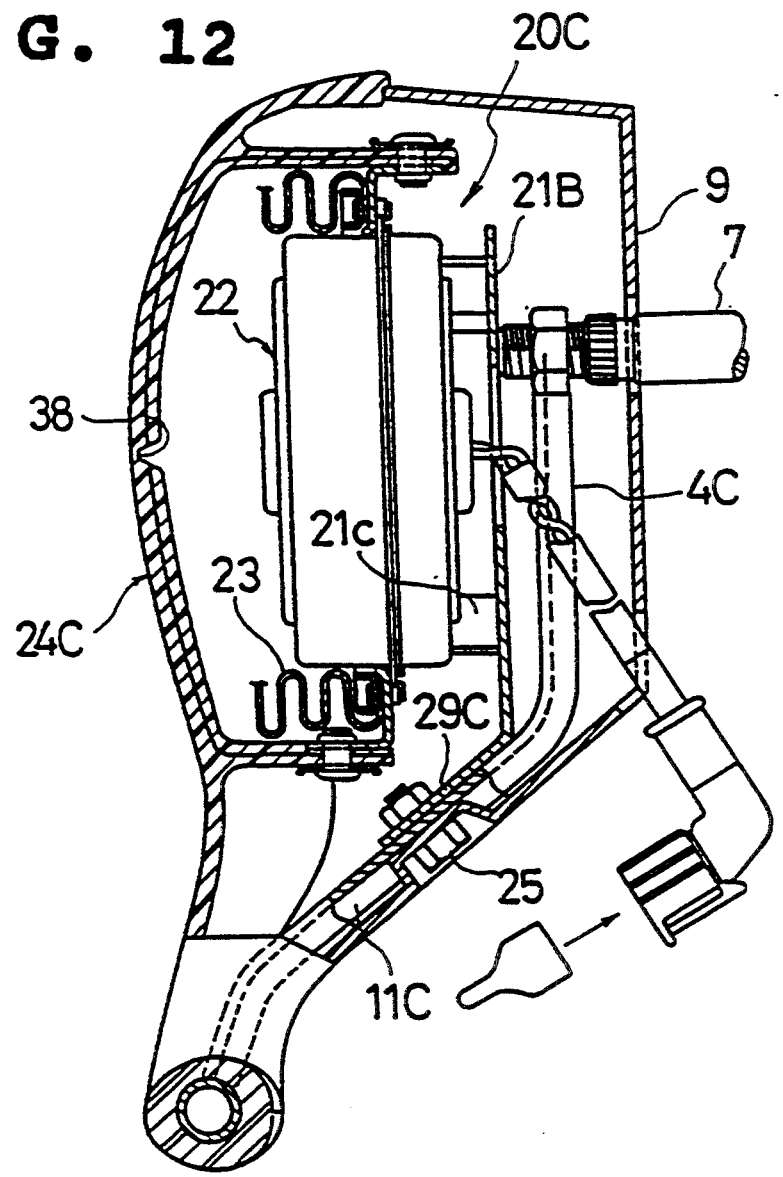
FIG. 12 is a cross-sectional view of FIG. 9 as seen along line XII—XII.

Bursting grooves 38, having an approximately H shape, are formed, as shown in FIGS. 1 and 2, on the internal surface of the upper wall 35. Grooves 38 are of reduced material thickness and burst when the air bag 23 unfolds. Extensions 39 and 40, covering the upper surfaces of the left and right pair of spoke portions 10 and the upper surfaces of the left and right pair of spoke portions 11, respectively, are formed in the upper wall 35.

The circumferential wall 36 forms a partition means and is provided to prevent, when the air bag 23 unfolds, the gas pressure in the air bag 23 from acting on the horn switch 50 or air bag 23 from catching on the horn switch 50, and guides the air bag 23 so as to unfold smoothly.

The flange 37 is formed to extend over approximately the whole circumference of and along the outer rim of the baseplate 21, and is secured to the flange 31 of the outer rim of the baseplate 21 at several points by rivets 41 or set screws. Indicated in FIG. 1 by reference numbers 42 and 43 are parting lines of the cover portion 24.

As is most clearly shown in FIG. 2, the upper left and right pair of extensions 26 of the baseplate 21 and the upper left and right pair of extensions 39 of the cover 24 are extended to the side and beyond the circumferential wall portion 36, and respective horn switches 50 are assembled both between the right-hand side extension 26 and the extension 39 and between the left-hand extension 26 and the extension 39. As these horn switches 50 are symmetrically structured and operate in the same manner, only the right-hand horn switch 50 will be described. A leg portion 51a of a mounting plate 51, formed by punching a metal sheet in a V-shape, is welded to the upper end portion of the extension 26, and the base portion 51b of the mounting plate 51 is disposed opposite the lower side of the extension 39. The horn switch 50 is formed by this mounting plate 51, a circuit board 52, an elastic insulating member 53, a circuit board 54, a plate member 55, and a support base 56. The circuit board 54 is connected to the mounting plate 51 by means of a lead wire 57, and the mounting plate 51 is grounded via the material of the transverse spoke member 3 and the steering shaft 7. The horn switch 50 comprises a switch disposed in the grounding circuit of the horn. On pressing the extension portion 39, the circuit boards 52 and 54 come into contact with each other, so that the horn switch 50 becomes ON, and the horn is actuated. The horn switch 50, during subassembling of the air bag module 20, is assembled to the air bag module 20 and then installed into the steering wheel 1 together with the subassembled air bag module 20.

In the operation of the automobile air bag device, because the air bag module 20 is made into a module on the baseplate 21 and assembled or attached by affixing the four mounting portions 27, 30 of the air bag module 20 with four bolts 25 to the spoke portions 10, 11, the installation of the air bag module 20 into the steering wheel 1 can be easily performed.

Since the circumferential wall 36 which covers the outer circumferential side of the air bag 23 is formed in the cover member 24 of the air bag module 20 and serves as a partition between the air bag 23 and the horn switch 50, the gas pressure in the air bag 23, when the air bag inflates and unfolds, does not act on the horn switch 50, so that there is no concern that the parts of the horn switch 50 might fly apart. Furthermore, the air bag 23, when inflating and unfolding, does not become entangled in the vicinity of the horn switch 50 and is guided by the circumferential wall 36 so as to unfold reliably.

The horn switch 50, because the horn switch 50 is subassembled to the air bag module 20 and installed in the steering wheel 1 together with the air bag module 20, can be installed easily. Moreover, because the mounting plate 51 of the horn switch 50 is secured to the extension 26 of the baseplate 21, the horn switch 50 can be supported with high structural rigidity and, accordingly, the feeling of operation of the horn switch 50 is maintained. There is no contact portion, and hence no occurrence of a poor contact, between the mounting plate 51 and extension 26, so that the operational reliability of the horn switch 50 is improved.

Referring to FIGS. 5 to 8, there is shown an air bag device in accordance with another preferred embodiment of the present invention. Parts which have the same function as those in the previous embodiment have been designated by the same or similar reference numbers and are not described. The following description is directed to only those parts which are different.

A circumferential wall portion 21a, standing in an upward direction, is formed at the outer circumference of a baseplate 21A of an air bag module 20A disposed in the steering wheel 1. A circumferential wall 36A of a cover member 24A is inserted and secured in the circumferential wall portion 21a. Baseplate extension members 26A and their baseplate mounting members 26B positioned at the bottom side are connected by welding, or otherwise secured, to respective lower wall portions of the baseplate 21A in the left-hand and right-hand corner portions of the upper portion of the baseplate 21A. Each baseplate extension member 26A is upstanding and extends upwards of a spoke portion 10. A mounting plate 51 is formed, opposite to the lower portion of the extension 39A at its top end portion, and a mounting portion 27A is formed in contact with the mounting seat 12 of the spoke portion 10 corresponding to each baseplate mounting member 26B. Baseplate mounting members 29B are welded, or otherwise secured, to the respective lower wall portions of the baseplate 21A in the left and right corners of the lower portion of the baseplate 21A, mounting portions 30A are formed contacting the mounting seat 12 of the spoke portion 11, corresponding to these respective baseplate mounting members 29B, and the air bag module 20A is finally assembled to the steering wheel 1 by securing its four mounting portions 27A, 30A to the spoke portions with bolts 25.

Actuating portions 59 of the horn switch 50A are secured to the upper left and right pair of extensions 39A of the cover member 24A, and insulating plates 60 are secured to the lower surface of actuating portions 59 and can complete the circuit only at contact points. Contact members 61, opposite the contact points of the insulating plates 60, are secured onto mounting plate portions 51A. A coil spring 62 is disposed between the insulating plate 60 and the mounting plate portion 51A and, when the actuating portion 59 is pressed and actuated, the contact point and the contact point member 61 come into contact so that the horn switch 50A is set ON. Designated by a reference number 70 is an inflator cover.

As the operation of this air bag device is nearly the same as that of the previous embodiment, a description of the operation is not necessary.

Referring to FIGS. 9 to 12, there is shown an air bag device in accordance with still another preferred embodiment of the present invention. Parts which have the same function as those in the previously described embodiments have been designated by the same or similar reference numbers and are not described. The following description is directed to only those parts which are different.

A steering wheel 1C is equipped with spoke members 3 extending left and right and one upward spoke member 4C having a wide portion combined with a baseplate 2. The steering wheel 1C is further equipped with three spoke portions 10, 11C. An air bag module 20C is assembled on these spoke portions 10, 11C. A first baseplate 21B is disposed over these spoke portions and has respective extensions 26C, 29C extending above the three spoke portions 10, 11C. A second baseplate 21C is disposed at the outer peripheral side of an inflation unit 22. The inflation unit 22 is inserted and secured to the second baseplate 21C. An upstanding circumferential wall portion 21a is disposed upwards of the external rim of the second baseplate 21C and a circumferential wall 36C of the cover component 24 is fitted and secured by a rivet 41 to the circumferential wall portion 21a.

An extension 26C extending onto a spoke portion 10 is formed, in a manner similar to the baseplate extension member 26A of the previous embodiment shown in FIG. 1 to 4, with a mounting portion 27A secured to the spoke portion 10 by bolts 25 and a mounting plate 51A for a horn switch 50C. This horn switch 50C is the same in structure and function as that of the previous embodiment shown in FIG. 1 to 4, and a description thereof is not necessary. Designated by a reference numeral 40C is an extension of the cover member 24C.

The baseplate body 21b of the first baseplate 21B is of a roughly circular shape and is disposed with a predetermined clearance or spacing in the lower side of the inflation unit 22. The respective upper end portions of four upstanding bracket portions 21c extending from the baseplate body portion 21b are secured by bolts 71 to the lower surface of the second baseplate 21C. When subassembling the air bag module 20C, an assembly, with the inflation unit 22 and the cover member 24C and the air bag 23 assembled to the second baseplate 21C, is assembled first to the first baseplate 21B, and then the horn switch 50C is assembled to the first baseplate 21B, and thus the module is made.

In this air bag device, the circumferential wall 36C of the cover member 24 also forms and functions as a partition between the air bag 23 and the horn switch 50C, the air bag module 20 is secured to the steering wheel 1C by securing three extensions 26C and 29C to the spoke portions 10, 11C, and the mounting plate 51A of the horn switch 50C is disposed at the upper end portion of the extension 26C. The air bag device of this embodiment operates in a similar manner to those of the previously described embodiments.

It is to be understood that although the invention has been described in detail with respect to preferred embodiments thereof, various other embodiments and variants are possible which fall within the scope and spirit of the invention, and such embodiments and variants are intended to be covered by the following claims.

What is claimed is:

1. An air bag system for protecting a driver in an automobile during a collision of the automobile, comprising:

a wheel body disposed in the automobile;

an air bag module including at least an air bag which is folded and installed therein and which is inflated and unfolded by gas during a collision of the automobile;

a transverse spoke member having opposing spoke portions secured to said wheel body;

a baseplate detachably mounted on said transverse spoke member, said baseplate including pairs of baseplate mounting portions and baseplate extensions extending at least part way along upper surfaces of said opposing spoke portions for connecting said air bag module to said wheel body so that said air bag module does not move relative to said wheel body;

mounting means, disposed on each of said baseplate mounting portions, for connecting a portion of said base plate extensions, extending upward along said opposing spoke portions, to middle portions of said opposing spoke portions of said transverse spoke member;

securing means, received by said mounting means, for detachably securing said baseplate mounting portions to said opposing spoke portions of said transverse spoke member;

horn switch means, mounted to said baseplate, for sounding a horn;

wherein said air bag module further includes a cover member having an upper wall, a circumferential wall, and extensions from the upper wall overlying the horn switch means, said upper wall, said circumferential wall and said extensions being integrally formed, said circumferential wall forming partition means disposed radially inside of said horn switch means and between said air bag and said horn switch means for preventing the air bag from affecting the horn switch means;

wherein said air bag module further includes an inflation unit for inflating and unfolding said air bag, said air bag system further comprising an additional baseplate, to which said inflation unit is secured, mounted on said baseplate detachably mounted on said transverse spoke member; and a plurality of bracket portions interposed between the baseplates and providing a clearance between the baseplates.

2. An air bag system as defined by claim 1, wherein said mounting means comprises a nut secured to each of said baseplate mounting portions and said securing means comprises a bolt receivable in said nut.

3. An air bag system as defined by claim 1, wherein each of said baseplate extensions is formed, in one piece, with one of said baseplate mounting portions.

4. An air bag system as defined by claim 3, wherein said horn switch means are mounted to said baseplate extensions.

5. An air bag system as defined by claim 3 and further comprising a lower cover covering a lower surface of said transverse spoke member.

6. An air bag system as defined by claim 5 wherein said lower cover is secured to said transverse spoke member by said securing means.

7. An air bag system as defined by claim 1, and further comprising a pair of obliquely and downwardly extending spoke members extending obliquely and downwardly from right and left portions of said baseplate and secured to both said baseplate and said transverse spoke member.

8. An air bag system as defined by claim 7, wherein each of the obliquely and downwardly extending spoke members includes an additional baseplate mounting portion used to mount said air bag module to said wheel body.

9. An air bag system as defined by claim 1, wherein said baseplate includes a pair of baseplate mounting members, on which said baseplate mounting portions are provided, and a separately formed pair of baseplate extension members, forming said baseplate extensions and to which said horn switch means are mounted.

10. An air bag system for protecting a driver in an automobile during a collision of the automobile, comprising:

a steering wheel disposed in the automobile and having spoke portions;

an air bag module including at least an air bag which is folded and installed in said steering wheel and which is inflated and unfolded by gas during a collision of the automobile;

a primary baseplate detachably mounted on said steering wheel for installing said air bag module in said steering wheel so that said air bag module does not move relative to said steering wheel;

an extension member integrated to said primary baseplate and extending upward along and secured to a middle portion of each of said spoke portions of said steering wheel;

an additional baseplate mounted on said primary baseplate for mounting inflation means for inflating and unfolding said air bag;

a plurality of brackets interposed between said primary baseplate and said additional baseplate so as to provide a clearance therebetween; and horn switch means mounted to an end portion of said extension member for sounding a horn;

wherein said air bag module further includes a cover member having an upper wall, a circumferential wall, and extensions from the upper wall overlaying the horn switch means, said upper wall, said circumferential wall and said extensions being integrally formed, said circumferential wall forming partition means disposed radially inside of said horn switch means for preventing the air bag from affecting the horn switch means, and wherein each extension member is bolted to one of said spoke portions of the steering wheel so that said primary baseplate is detachably mounted on said steering wheel.

11. An air bag system for protecting a driver in an automobile during a collision of the automobile, comprising:

a steering wheel disposed in the automobile and having spoke portions;

an air bag module including at least an air bag which is folded and installed in said steering wheel and which is inflated and unfolded by gas during a collision of the automobile;

a primary baseplate detachably mounted on said steering wheel for installing said air bag module in said steering wheel so that said air bag module does not move relative to said steering wheel;

an extension member integrated to said primary baseplate and extending upward along and secured to a middle portion of each of said spoke portions of the steering wheel;

an additional baseplate mounted on said primary baseplate for mounting inflation means for inflating and unfolding said air bag;

a plurality of brackets interposed between said primary baseplate and said additional baseplate so as to provide a clearance therebetween; and horn switch means mounted to an end portion of said extension member for sounding a horn;

wherein said air bag module further includes a cover member having an upper wall, a circumferential wall, and extensions from the upper wall overlaying the horn switch means, said upper wall, said circumferential wall and said extensions being integrally formed, said circumferential wall forming partition means disposed radially inside of said horn switch means for preventing the air bag from affecting the horn switch means, and wherein said primary baseplate comprises a baseplate mounting member for mounting the primary baseplate to said spoke portions of the steering wheel and the baseplate mounting member is bolted to the spoke portions of the steering wheel so that said primary baseplate is detachably mounted on said steering wheel.

* * * * *